United States Patent [19]

Gruszczynski et al.

[11] Patent Number: 5,367,440

[45] Date of Patent: Nov. 22, 1994

[54] FLEXIBLE FIBER OPTIC ILLUMINATOR AND METHOD

[75] Inventors: David W. Gruszczynski; Russell J. Palum; Sarah R. Welch, all of Rochester; Andrew D. Thompson, Pittsford; Richard A. Bierma, Webster, all of N.Y.

[73] Assignee: Eastman Kodak Company, Rochester, N.Y.

[21] Appl. No.: 930,569

[22] Filed: Aug. 14, 1992

[51] Int. Cl.⁵ ............................................... F21V 8/00
[52] U.S. Cl. ....................................... 362/32; 385/901; 385/120
[58] Field of Search ................... 362/32; 156/158; 385/114, 115, 116, 120, 901

[56] References Cited

U.S. PATENT DOCUMENTS

| | | | |
|---|---|---|---|
| 3,043,910 | 7/1962 | Hicks, Jr. | 178/7.85 |
| 3,357,423 | 12/1967 | Winchester et al. | 128/23 |
| 3,590,232 | 6/1971 | Sadowski | 240/2 |
| 3,592,199 | 7/1971 | Ostensen | 128/6 |
| 3,614,414 | 10/1971 | Gores | 240/2 |
| 3,614,415 | 10/1971 | Edelman | 240/2.18 |
| 3,634,938 | 1/1972 | Hutchinson | 32/27 |
| 3,718,814 | 2/1973 | Van Slyke | 240/8.16 |
| 3,794,091 | 2/1974 | Ersek | 150/52 R |
| 3,800,135 | 3/1974 | Ramsey | 240/8.16 |
| 3,950,074 | 4/1976 | Tanaka | 385/116 |
| 4,086,919 | 5/1978 | Bullard | 128/11 |
| 4,138,193 | 2/1979 | Olszewski et al. | 385/114 |
| 4,337,763 | 6/1982 | Petrassevich | 128/20 |
| 4,355,865 | 10/1982 | Conrad et al. | 385/114 |
| 4,597,030 | 6/1986 | Brody et al. | 385/115 X |
| 4,845,596 | 7/1989 | Mouissie | 362/32 |
| 4,980,007 | 12/1990 | Ferguson | 385/114 X |
| 5,009,020 | 4/1991 | Watanabe | 362/32 X |
| 5,036,435 | 7/1991 | Tokuda et al. | 362/32 X |

*Primary Examiner*—Carl D. Price
*Attorney, Agent, or Firm*—Clyde E. Bailey

[57] ABSTRACT

A flexible fiber optic illuminator 10 for inspecting an interior space, comprises a thin fiber optic element 12 composed of a plurality of optic fibers 20 arranged in at least one substantially planar layer having front and back sides 32,34. Thin stiffner members 24,26 are arranged adjacent to the optic fibers 20 to provide reinforcement. First and second layers 28,30 of adhesive material having adhering means on one side only, are fixedly adhered to the back and front sides of the planar layer 22. A protective jacket 36 for optic fibers 20 and stiffner members 24,26 is therefore defined by first and second adhesive layers 28,30. A light source 14 coupled to the fiber optic element 12 is provided for illuminating the optic fibers 20. In another embodiment of the invention, a method of inspecting an interior space is provided which comprises providing the fiber optic slot illuminator 10 of the invention and, inserting and positioning the illuminator 10 in the interior space for effective illumination of the interior space.

15 Claims, 7 Drawing Sheets

FLEXIBLE FIBER OPTIC ILLUMINATOR AND METHOD

FIELD OF THE INVENTION

The invention relates to illuminators, and more particularly, to an apparatus and method for illuminating a coating hopper to improve inspection thereof.

BACKGROUND OF THE INVENTION

Various techniques have been devised to inspect the inside of an interior space, such as a coating hopper used in the application of aqueous or solvent solutions to a moving substrate. Coating hoppers used in the manufacture of sensitized products, such as photographic film and photographic paper, generally have narrow slots through which solution passes prior to being applied to a web or roll. A typical coating hopper (FIG. 1), such as described in U.S. Pat. No. 4,287,240, assigned to Eastman Kodak Co., comprises a substantially rectangular body portion 1 having a slot 2 formed between two substantially rectangular bars 3,4. The slot length (L) is defined as the distance from the cavity (C) to the slide surface (S). The width of the hopper slot is the distance from one end of the hopper to the other or the length of the bars 3,4. In operation, the solution contained in the hopper (FIG. 1) is distributed through the hopper slot 2, onto the hopper slide subface (S) and, onto the web or roll to be coated. Obstructions in the slot of the hopper can result in localized widthwise nonuniformities in the delivery of the solution to the web or roll. The localized widthwise nonuniformity can be of great enough magnitude that it would be considered a defect in the web coating and the web would have to be scrapped. Thus, the cleanliness of the slots of the "coating hoppers" is critical in the manufacture of defect free web coatings.

One such method of inspecting a coating hopper environment involves the use of a hand held light source and a thin piece of transparent plastic material. In this method, the inspector holds the plastic material over a hopper slot while water is delivered through the hopper slot. The inspector then positions the light source over the hopper slot. The transparent material together with the running water enables light to be directed into the slot. The inspector then peers through the transparent material to examine the slot for particulate or foreign objects. Another technique also involves the use of a hand held light source and a transparent plastic material. In this technique, the inspector inserts the plastic material into the hopper slot (with or without water running through the hopper slot) and again positions the light source and his or her eyes over the slot. The light source illuminates the edge of the plastic material to provide a glowing surface which acts as a light source to illuminate the hopper slot. The inspector must position the light source at the correct angle to assure proper illumination of the slot. The inspector must then position his/her eye over the hopper slot to peer into the slot.

The problem with the prior art techniques and apparatus for inspecting a slot is the inherent difficulty in performing the inspection. Prior art techniques require that the inspector hold, angle, or position a plastic material and a light source while simultaneously orienting his/her eye over the hopper slot. Thus, the result of having any one of these items out of alignment creates a potential for not identifying particulate matter that may be present in the slot of the hopper. Other shortcomings of the prior art techniques include the presence of reflections and the inability to distinguish between the reflections and the actual slot. Moreover, the task of inspecting using existing devices is also quite time consuming because of the complexity of aligning the various elements of the inspection as indicated above, i.e., the plastic, light source, and inspector's eye. Consequently, the foregoing shortcomings of prior art inspection methods invariably result in residual particulates or contaminants in the hopper slot that result in a localized widthwise nonuniformity in the web coating.

The device of Van Slyke, U.S. Pat. No. 3,718,814, is one such attempt to provide a fiber optic illuminator for remote inspection. Van Slyke depends on the illuminator emitting light laterally of the axis of the bundle where the illuminator is desired. This arrangement, however, does not permit illumination of the entire work area because there is no axial transmission of light.

Accordingly, there persists a need for an inspection method and apparatus therefor that obviates the shortcomings of the prior art techniques, and in particular, one that enables the inspector to fully inspect all regions of the hopper environment.

SUMMARY OF THE INVENTION

It is, therefore, the object of the invention to overcome the shortcomings of the prior art. Accordingly, for accomplishing these and other objects of the invention, there is provided a fiber optic illuminator comprised of a thin fiber optic element. The fiber optic element is comprised of a plurality of optic fibers arranged in at least one substantially planar layer having front and back sides. Thin stiffner members, preferably stainless steel strips, coplanar with the optic fibers, are arranged adjacent to the optic fibers. First and second layers of adhesive material, having adhering means on one side only, is fixedly adhered to the back side and front side, respectively, of the planar layer containing the optic fibers and stiffner member. The fixedly adhered adhesive material, therefore, defines a protective jacket for the optic fibers and stiffner members. The protective jacket has at least one opening through its thickness to define the active area of the element. In addition to the fiber optic element, the illuminator includes a light source for illuminating the fiber optic element and means for attaching the light source to the fiber optic element.

BRIEF DESCRIPTION OF THE DRAWINGS

The foregoing as well as other objects, features and advantages of this invention will become more apparent from the appended Figures, wherein like reference numerals denote like elements, and wherein.

DETAILED DESCRIPTION OF THE INVENTION

Figures 1, 2:
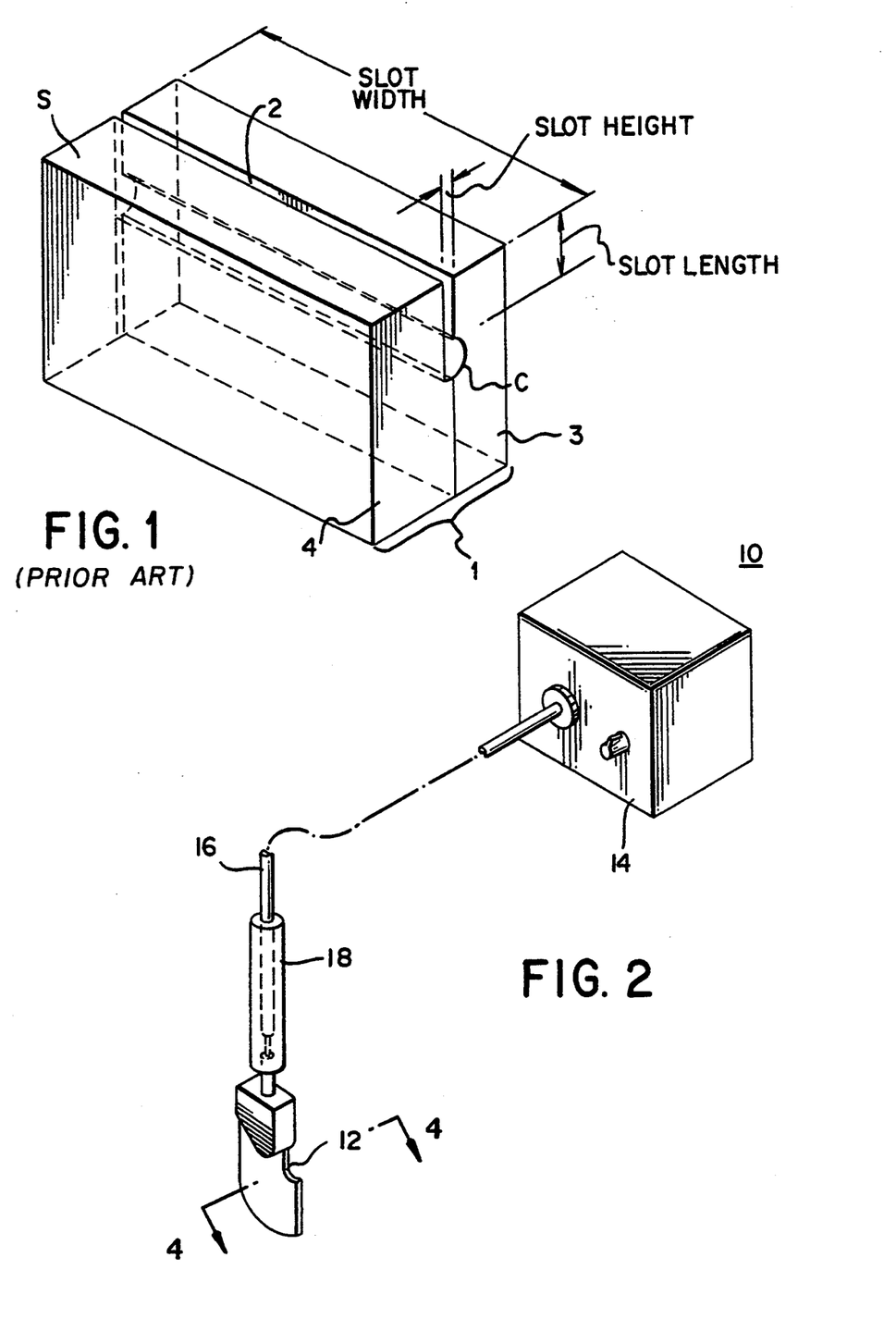
FIG. 1 is a perspective view of a coating hopper of the prior art.
FIG. 2 is a perspective view of the apparatus of the invention.

Turning now to the drawings, and more particularly to FIG. 2, there is shown fiber optic illuminator 10 constructed in accordance with the principles of the invention. Fiber optic illuminator 10 is comprised generally of a thin fiber optic element 12, a light source 14 for illuminating the fiber optic element 12, a fiber optic cable 16 for transmitting light from the light source 14 to the fiber optic element 12, and a means 18 for attaching the fiber optic cable 16 to the fiber optic element 12.

Figure 3:
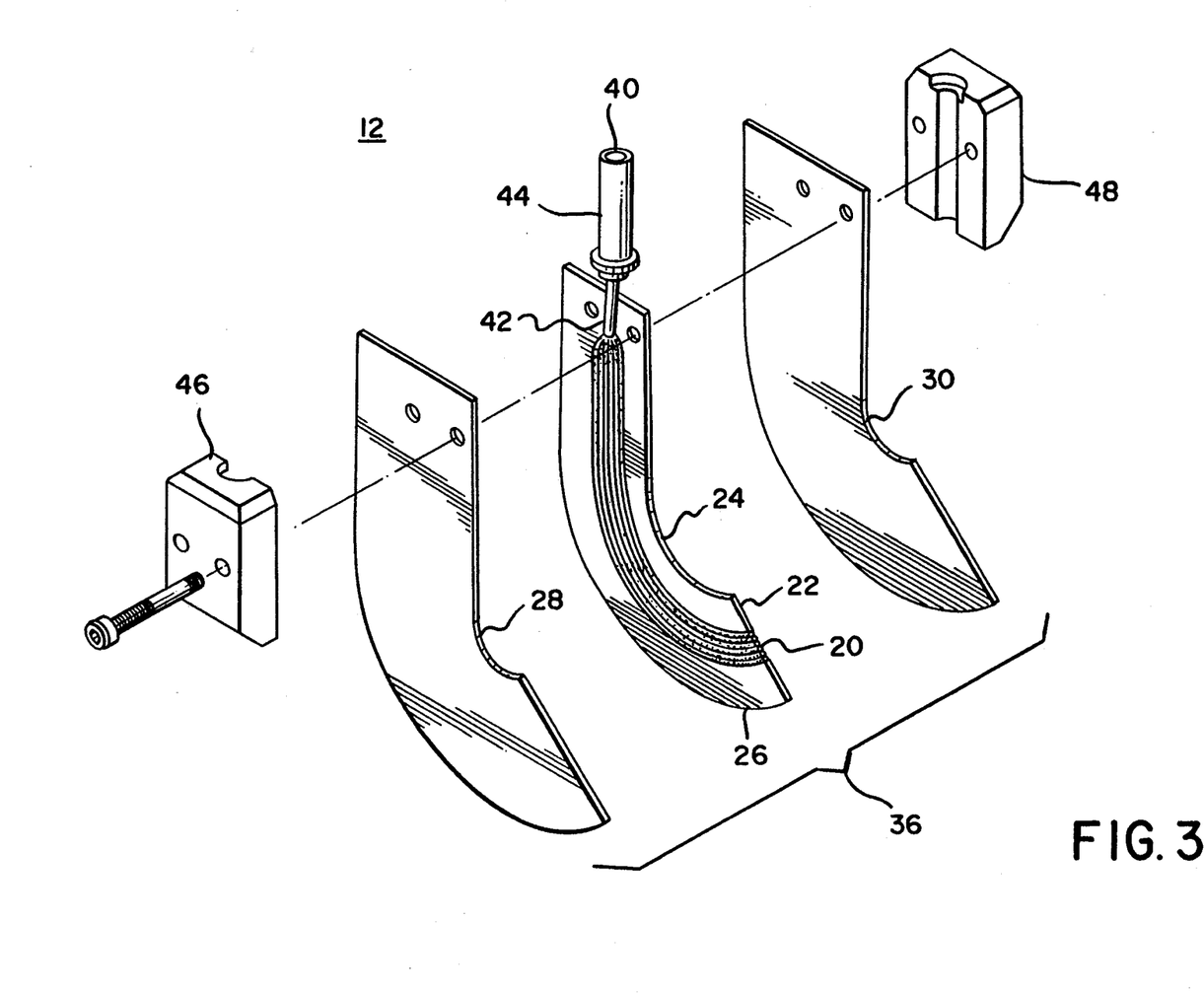
FIG. 3 is an exploded perspective view of the fiber optic element of the invention.
Figure 4:
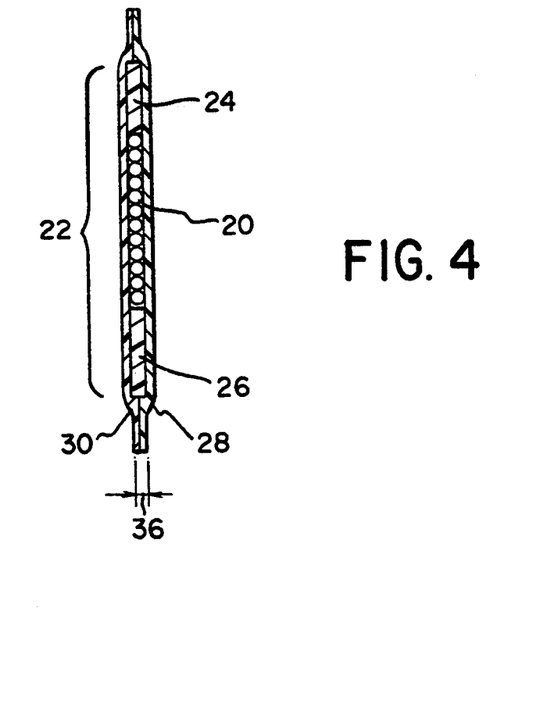
FIG. 4 is a partial cross sectional view of the fiber optic element of the invention exposing fiber optic fibers taken along the 4—4 line of FIG. 2.
Figure 7:
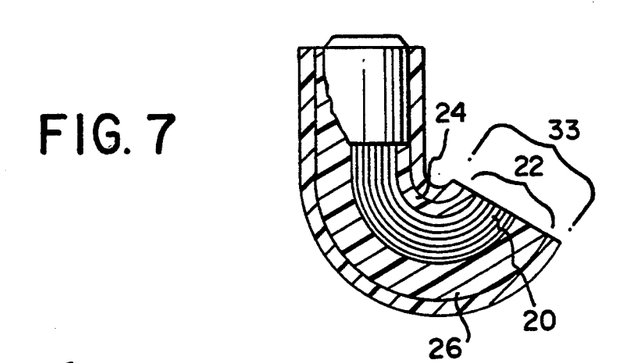
FIG. 7 is a elevation view partially in section of another alternative embodiment of the element.
Figure 8:
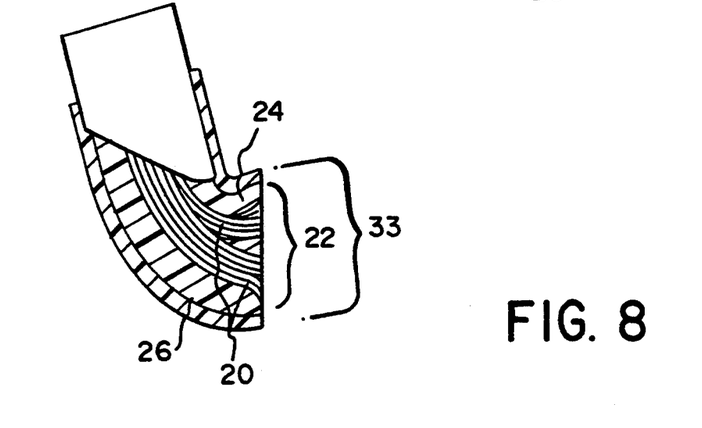
FIG. 8 is a perspective view of another alternative embodiment of the element.

FIGS. 3 & 4 show the fiber optic element 12 composed of a plurality of optic fibers 20 arranged in at least one substantially planar layer 22. Spaced stiffner members 24, 26 are shown arranged adjacent to optic fibers 20 and substantially coplanar therewith. First and second layers 28,30 comprising an adhesive material having adhering means on one side only is fixedly adhered to the front and back sides 32,34 (only one side shown) respectively, of the planar layer 22 comprising the stiffner members 24,26 and optic fibers 20. Layers 28,30, therefore, define a protective jacket 36 for the coplanar optic fibers 20 and stiffner members 24,26. Protective jacket 36 has at least one opening 38 (FIGS. 6–8) through its thickness to define the active area of element 12. Layers 28,30 hold the fiber optic element 12 together, and are a protective barrier to prevent scratching of the hopper interior surfaces or work environment. Stiffner members 24,26 prevent the fiber optic element 12 from easily being damaged, i.e. bent or torn. Optic fibers 20 transmit light from the light source 14 through fiber optic cable 16 to the interior of the hopper. Just about any light source 14 within the definition of the invention may be used to illuminate the optic fibers 20. In one embodiment, a flash light having a handle is rigidly attached to the fiber optic element 12. The handle enables the user to maneuver the illuminator to various locations in the interior space. Also, at one end 40 of the fiber optic element 12, the optic fibers 20 are arranged together to form a fiber optic bundle 42 and the bundle 42 is inserted through a stainless steel ferrule 44 (FIG. 3). Ferrule 44 holds the optic fibers 20 in a bundled arrangement for efficient transfer of light from the fiber optic cable 16. Plastic clamping blocks 46,48, in the preferred embodiment, position ferrule 44 in relation to the rest of the fiber optic element 12, including first and second adhesive layers 28,30, stiffner members 24,26, and optic fibers 20. Plastic blocks 46,48 are preferred because they resist damaging the hopper slide surface (S) and they slide easily along surface (S). Those skilled in the art will appreciate that other means to secure the fiber optic element 12 within the requirements of the invention may be used.

In the preferred embodiment, tape in first and second adhesive layers 28,30 comprises a non-photoactive, single-sided polyimide adhesive tape manufactured by Permacel located New Brunswick, N.J., although other adhesive materials within the definition of the invention can be used. Non-photoactive tape material is preferred because it use reduces the risk of contaminating the emulsion flowing through the coating hopper due to residue resulting from ordinary tape wear. The thickness of the adhesive material in the preferred embodiment is approximately 0.002 inches. Tape having a thickness of about 0.0025 inches or less is acceptable and within the contemplation of the invention.

In the preferred embodiment, stiffner members 24,26 are stainless steel. Because the fiber optic element 12 is used in a water environment, the stainless steel material prevents the fiber optic element 12 from rusting. Stainless steel stiffner members 24,26 also provide excellent resistance to tearing or shearing because of the materials strength. The thickness of the stainless steel strips 24,26 in the preferred embodiment, is about 0.002 inches or less. Those skilled in the art will appreciate that other materials and means of providing reinforcement for the optic fibers may be used, such as, heat sealing the tape along the periphery of the optic fibers.

Figure 6:
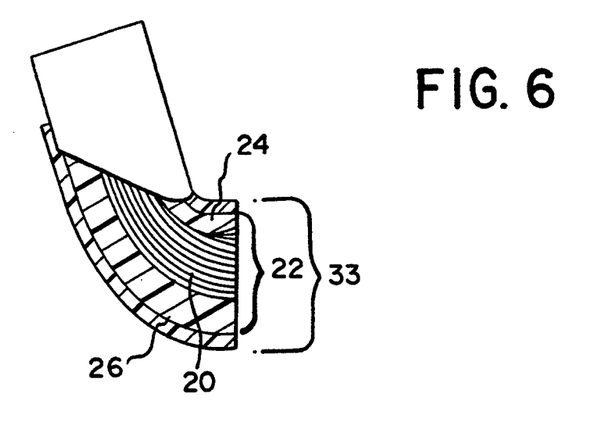
FIG. 6 is a elevation view partially in section of the preferred embodiment of the element.
Figure 13:
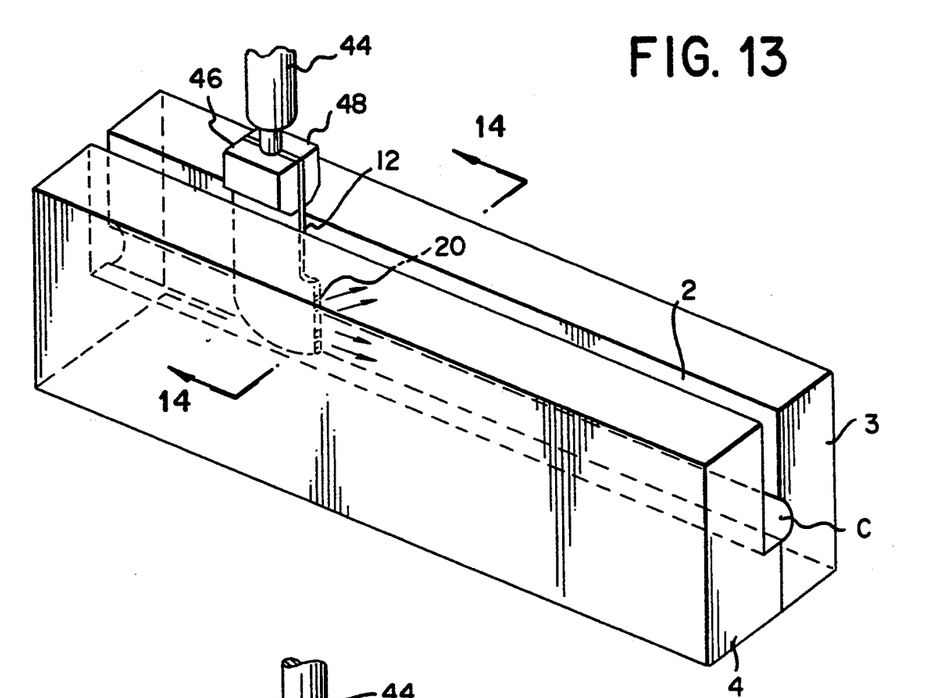
FIG. 13 is a perspective view of the element of FIG. 8 as it would appear in the hopper slot; and, FIG. 14 is a perspective view showing the element taken along the line 14—14 of FIG. 13.
Figure 14:
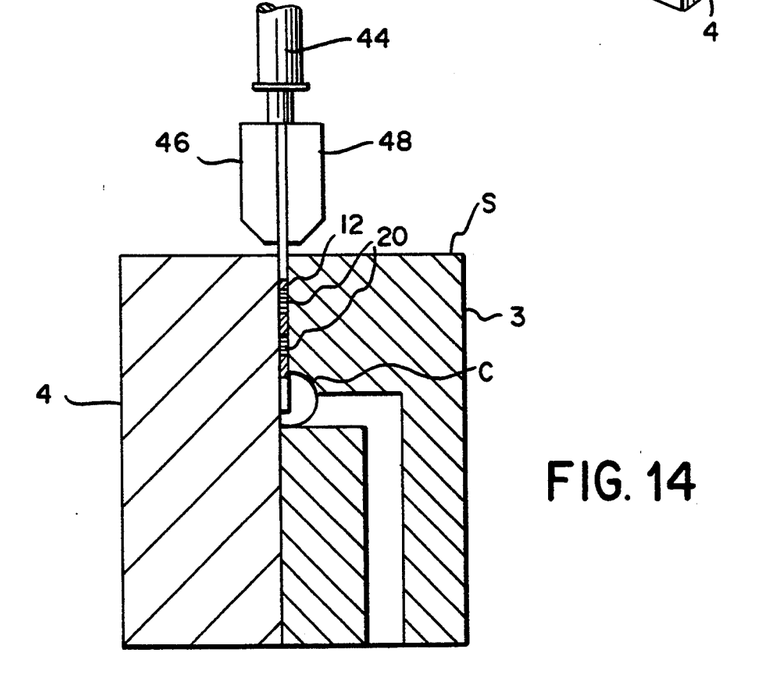

Optic fibers 20 in the preferred embodiment are manufactured by General Fiber Optics, Co. of Cedar Groove, N.J., although other optic fibers within the requirements of the invention may be used. In the preferred embodiment, the optic fibers 20 in the fiber optic element 12 are arranged in a substantially planar layer and the optic fibers within the planar layer are substantially parallel (FIG. 6). In this arrangement, light is directed substantially parallel to the hopper slide surface (S), as shown more clearly in FIGS. 9 & 10. This creates a "headlight effect" in the hopper slot, i.e., the light is directed from the fiber optic element 12 to along the longitudinal axis of the hopper slot. Any particulate matter in the hopper slot will block the light being directed along the hopper slot resulting in a localized highlight/shadow effect which can be detected by the inspector. In another embodiment (FIG. 7), the optic fibers 20 are arranged such that the light is directed upwardly toward the hopper slide surface (S), as shown more clearly in FIG. 11 & 12. This creates a "backlighting" effect in the hopper slot. Any particulate matter in the hopper slot will block light being directed across the slot resulting in an area of lower light intensity which can be detected by the inspector. Finally, in yet another embodiment (FIG. 8), the optic fibers 20 are arranged both upwardly toward and parallel to the hopper slide surface (S), as shown more clearly in FIGS. 13 & 14. In this arrangement, light from the element 12 is directed partially in a "headlighting" and a "backlighting" manner, as described above.

Further, according to the requirements of the invention, optic fibers 20 may have a thickness of less than about 0.0035 inches, although less than about 0.003 inches is preferred. The determining factor for the thickness selection of the polyimide adhesive tape, stiffner members 24,26, and optic fibers 20 is that the total thickness of the fiber optic element 12 must be less than 0.008 inches. Those skilled in the art will appreciate that for larger hopper slot sizes, the overall dimensions of the apparatus of the invention may be larger than 0.008 inches. According to experiments conducted by the inventors, the apparatus of the invention is sized approximated 0.002 inches less than the hopper slot size. Thus, a 0.008 inch thick apparatus would be used to inspect a 0.010 inches hopper slot.

Figure 5:
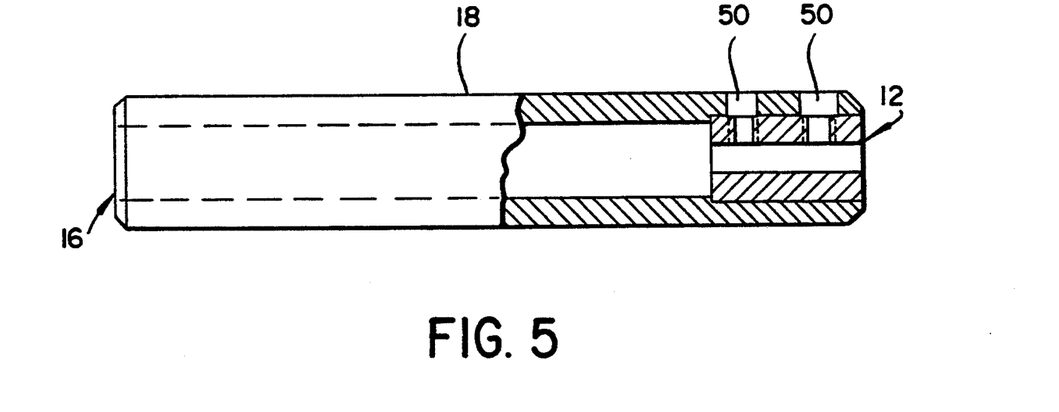
FIG. 5 is a partial cross sectional view of the means of attaching the fiber optic bundle to the element.

While there are many means of attaching the fiber optic element 12 to the cable 16, FIG. 5 shows the preferred means used in the invention. The fiber optic element 12 and fiber optic cable 16 are joined together using a common fitting and secured set screws 50.

Figure 9:
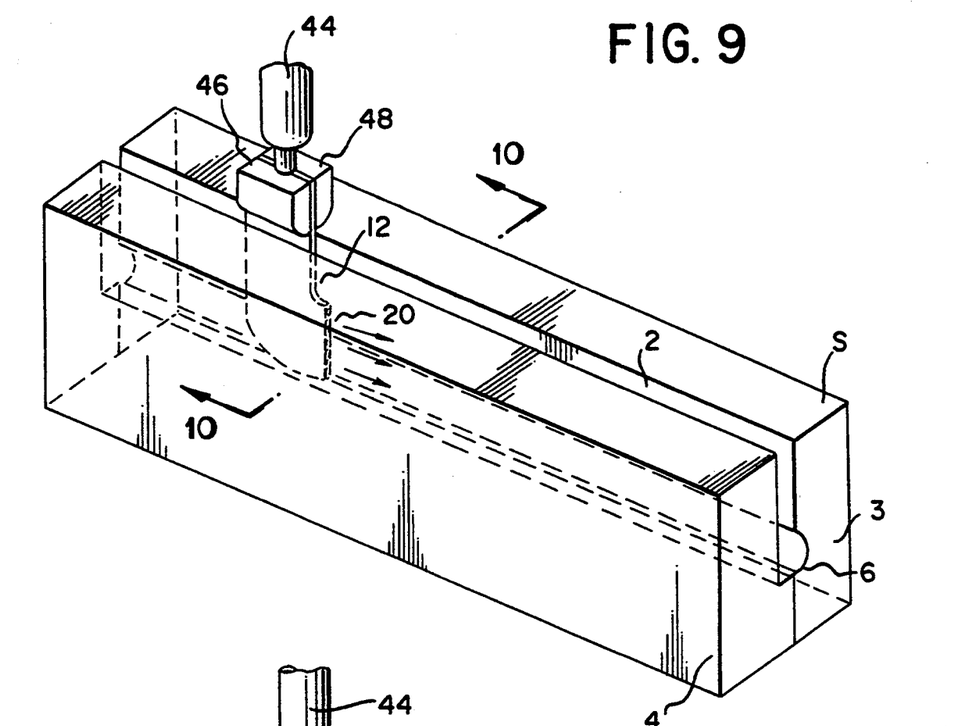
FIG. 9 is a section view showing the element of FIG. 6 as it would appear in the hopper slot.
Figure 10:
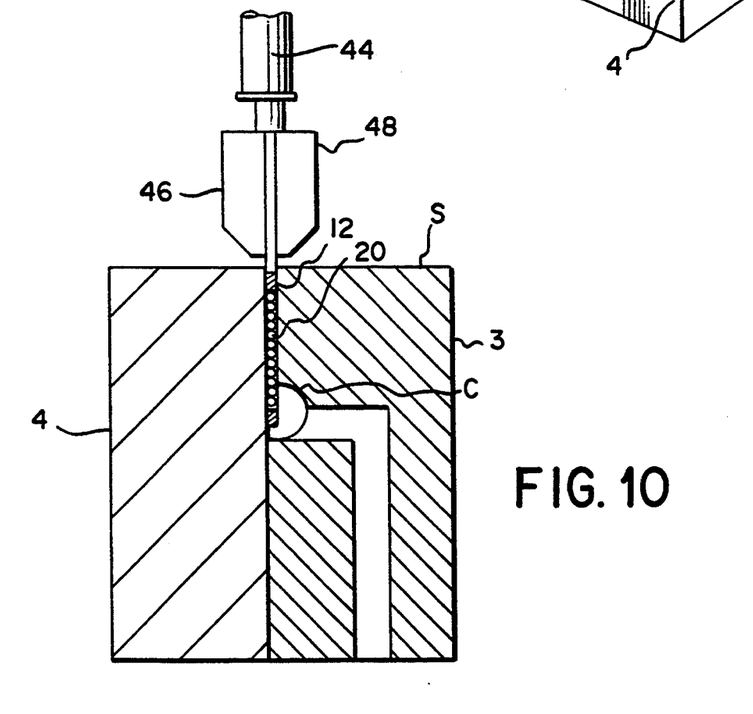
FIG. 10 is a perspective view showing the element taken along line 10—10 of FIG. 9.
Figures 11, 12:
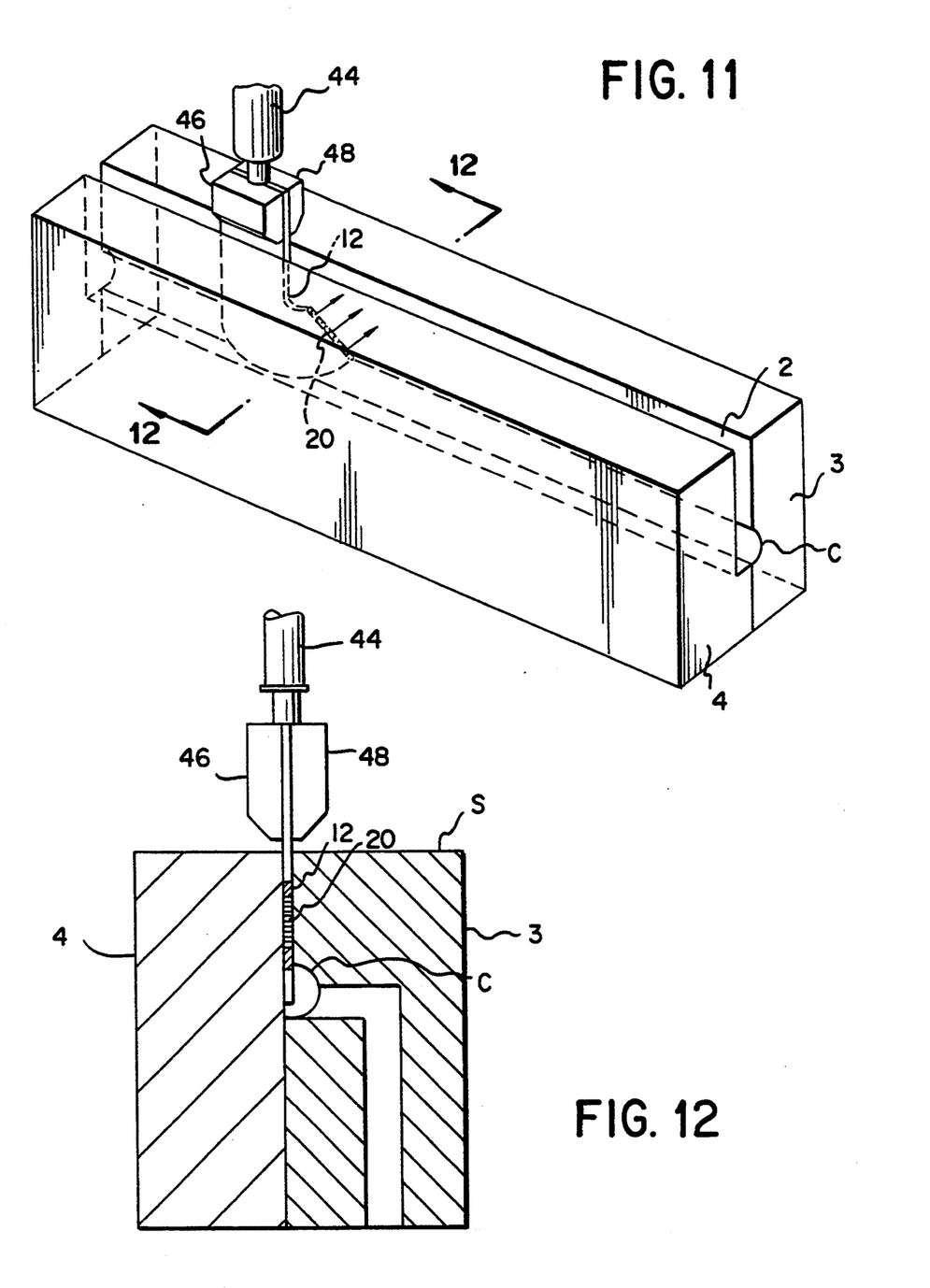
FIG. 11 is a perspective view of the element of FIG. 7 as it would appear in the hopper slot.
FIG. 12 is a perspective view showing the element taken along the line 12—12 of FIG. 11.

In operation, the flexible fiber optic illuminator 10 of the invention is used to inspect an interior space, such as a coating hopper slot, for particulate matter that was not completely removed by the cleaning procedure or residual air that was not completely removed by the production preparation procedure. The inspection for remaining particulates in the hopper slot is performed in the following manner. First, the light source 14 of the flexible fiber optic slot illuminator 10 is turned on and the fiber optic element 12 is inserted into the hopper slot. FIG. 9 shows the preferred embodiment of the fiber optic element 12 positioned in a hopper slot. The arrows indicate the direction of light emitted from the fiber optic element 12 into the hopper slot. In FIG. 10, the fiber optic element 12 of FIG. 9 is shown as positioned in the hopper slot. FIG. 11 depicts an alternative embodiment of the fiber optic element 12 positioned in a hopper slot, with arrows indicating the direction of light directed from the fiber optic element 12 into the hopper slot, the depth penetration being limited by blocks 46,48. In FIG. 12, the fiber optic element 12 of FIG. 11 is shown as positioned in the hopper slot, the depth of penetration being limited by blocks 46,48. The operator positions his/her eye above the hopper slot enabling himself/herself to see directly into the hopper slot. The operator then adjusts the light source 14 to the correct intensity for optimum viewing efficiency in the hopper slot. The operator then scans the entire hopper slot using the device. The operator looks for obstructions in the light path to his/her eye or for localized highlights or shadows which would indicate an obstruction in the hopper slot, i.e., a particle or contaminant. The angle of the light emitted by the fiber optic element 12 can be changed by holding the means for attaching 18 or handle at a different angle to the surface of the hopper. By doing this, the operator can change the direction of the light from out of the slot toward the operators eye to along the slot toward the end of the hopper.

Thus, in another embodiment of the invention, a method of inspecting a coating hopper comprises providing a fiber optic illuminator 10, as described above; inserting the illuminator 10 into the slot of the hopper slot such that the fiber optic element 12 extends into the region of inspection; maneuvering the light source 14 of illuminator 10 for effective illumination of the slot. Moreover, the light intensity and light angle can be adjusted to accommodate the viewing requirements of the operator.

The inspection method of the invention can be performed with or without water running through the hopper slot, as described above. Operator discretion is employed to determined whether or not running water is necessary for optimum viewing of the hopper environment. Thus, the present inspection method provides a novel technique for observing latent hardened particles, and the like, on hopper slot walls as well as detecting air bubbles in the hopper slot and cavity.

Accordingly, an important advantage of the present invention is that it provides an effective apparatus and method for fully inspecting all regions of a hopper, particularly a coating hopper, despite obstructions that may exist in the hopper.

The invention has therefore been described with reference to certain embodiments thereof, but it will be understood that variations and modifications can be effected within the scope of the invention.

What is claimed is:

1. A thin fiber optic element for use in an illuminator capable of inspecting a narrow interior space, comprising:

(i) a plurality of optic fibers, said optic fibers having at least partially exposed transverse end portions, said optic fibers being arranged in at least one substantially planar layer, said planar layer having front and back sides and an edge portion formed by the partially exposed transverse end portions of the optic fibers, said edge portion defining an active area of said optic fibers;

(ii) at least one thin stiffner member adjacent to said optic fibers and substantially coplanar therewith for reinforcing said optic fibers;

(iii) a first layer of adhesive material having adhering means on one side only, said adhering means fixedly adhered to said back side of said planar layer; and, (iv) a second layer of adhesive material having adhering means on one side only, said adhering means fixedly adhered to said front side of said planar layer, said fixedly adhered first and second layers of adhesive material defining a protective jacket surrounding said active area, said surrounded active area being configured so that light emitted therefrom is directed outwardly and substantially perpendicular to said edge portion;

said thin stiffner member and said flexible protective jacket providing means for imparting pliancy to said fiber optic element so that said element is easily maneuverable in said interior space.

2. The fiber optic element of claim 1 wherein said optic fibers in said planar layer are arranged such that light is directed substantially along a longitudinal axis of said interior space.

3. The fiber optic element of claim 1 wherein said optic fibers in said planar layer are arranged such that a portion of the light is directed substantially along a longitudinal axis of said interior space and the remaining portion of the light is directed substantially upwardly of said interior space.

4. A flexible fiber optic illuminator for inspecting an interior space, comprises:

(a) a thin fiber optic element having a substantially J-shape comprising:

(i) a plurality of optic fibers, said optic fibers having at least partially exposed transverse end portions, said optic fibers being arranged in at least one substantially planar layer, said planar layer having front and back sides and an edge portion formed by the partially exposed transverse end portions of the optic fibers, said edge portion defining an active light emitting area of said optic fibers;

(ii) at least one thin stiffner member adjacent to said optic fibers and substantially coplanar therewith for reinforcing said optic fibers;

(iii) a first layer of adhesive material fixedly adhered to said back side of said planar layer; and, (iv) a second layer of adhesive material fixedly adhered to said front side of said planar layer, said fixedly adhered first and second layers of adhesive material defining a flexible protective jacket surrounding said active light emitting area, said surrounded active area being configured so that light emitted from said active light emitting area is directed outwardly and substantially perpendicular to said edge portion;

said thin stiffner member and said flexible protective jacket providing means for imparting pliancy to fiber optic element so that said element is easily maneuverable in said interior space;

(b) a light source for illuminating said fiber optic element, said light source being in communication with said optic fibers so that light from said source when directed onto said optic fibers illuminates said fiber optic element; and, (c) means for attaching said light source to said fiber optic element, said attaching means comprising a fiber optic cable cooperatively connected between said light source and said fiber optic element.

5. The fiber optic illuminator recited in claim 4 wherein said first and second layers of adhesive material is made of a polyimide adhesive.

6. The fiber optic illuminator recited in claim 4 wherein said optic fibers in said planar layer have a thickness of about 0.002 inches.

7. The fiber optic illuminator recited in claim 4 wherein said stiffner members have a thickness of less than about 0.003 inches.

8. The fiber optic illuminator of recited in claim 4 wherein said first and second layers of adhesive material each has a thickness of about 0.002 inches.

9. The fiber optic illuminator recited in claim 4 wherein said stiffner member is stainless steel.

10. The fiber optic illuminator recited in claim 4 wherein said optic fibers in said planar layer are arranged in a close packed, nonoverlapping relationship.

11. A flexible fiber optic illuminator, comprising:

(a) a fiber optic element having a substantially J-shape including:

(i) a plurality of optic fibers, said optic fibers having at least partially exposed transverse end portions, said optic fibers being arranged in at least one substantially planar layer, said planar layer having front and back sides and an edge portion formed by the partially exposed transverse end portions of the optic fibers, said edge portion defining an active area of said optic fibers;

(ii) a metal layer adjacent to said optic fibers and substantially coplanar therewith for reinforcing said optic fibers;

(iii) a first layer of non-photoactive polyimide tape having adhering means on one side only, said adhering means fixedly adhered to said back side of said planar layer;

(iv) a second layer of non-photoactive polyimide tape having adhering means on one side, said adhering means fixedly adhered to said front side of said planar layer, said fixedly adhered first and second layers defining a flexible protective jacket surrounding said active area said surrounded active area being configured so that light emitted therefrom is directed outwardly and substantially perpendicular to said edge portion;

said thin stiffner member and said flexible protective jacket providing means for imparting pliancy to said fiber optic element so that said element is easily maneuverable in said interior space;

(b) a light source for illuminating said fiber optic element, said light source being in communication with said optic fibers so that light from said source when directed onto said optic fibers illuminates said fiber optic element; and, (c) means for attaching said light source to said fiber optic element, said attaching means comprising a fiber optic cable cooperatively connected between said light source and said fiber optic element.

12. The flexible fiber optic illuminator of claim 11 wherein said optic fibers are arranged in a substantially uniform layer, and wherein said optic fibers within said layer are arranged in a close packed, nonoverlapping relationship.

13. The flexible fiber optic illuminator of claim 11 wherein said metal layer is stainless steel.

14. The flexible fiber optic illuminator of claim 11 wherein said optic fibers have a thickness of about 0.002 inches.

15. The flexible fiber optic illuminator of claim 11 wherein said first and second layers of polyimide tape each has a thickness of about 0.002 inches.

* * * * *